(No Model.)
G. L. KAHLE.
BICYCLE SUPPORT FOR RAILWAY CARS.
No. 603,509. Patented May 3, 1898.
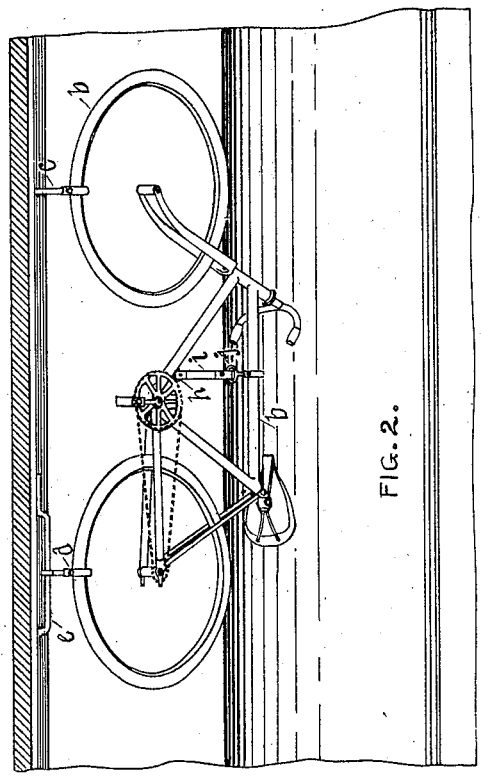
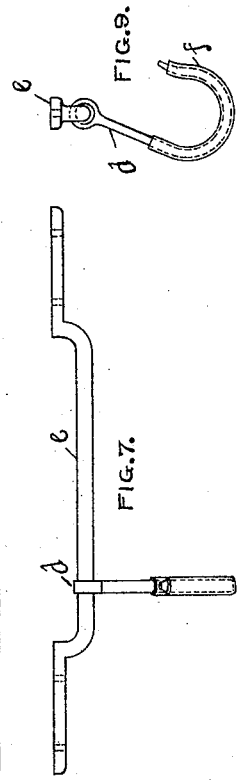
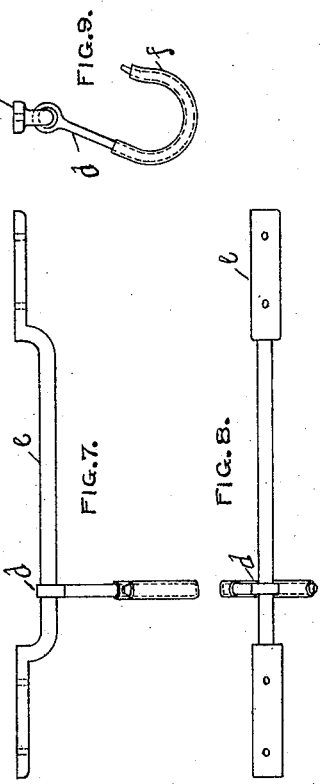
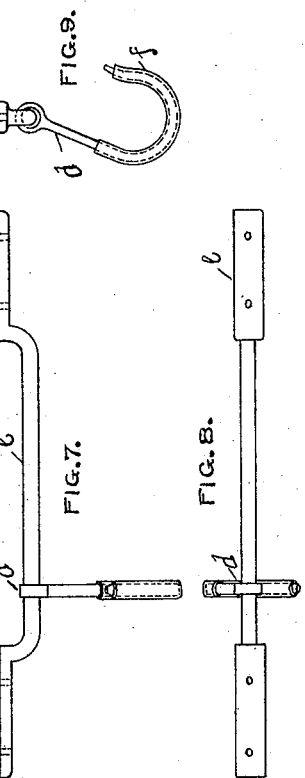
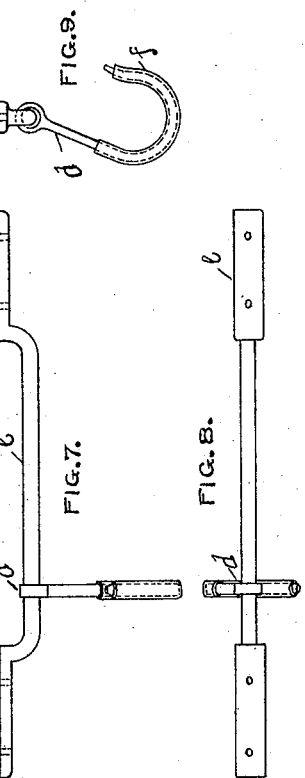
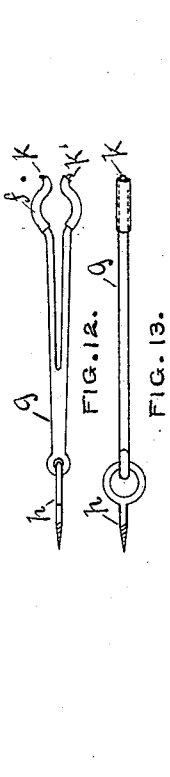
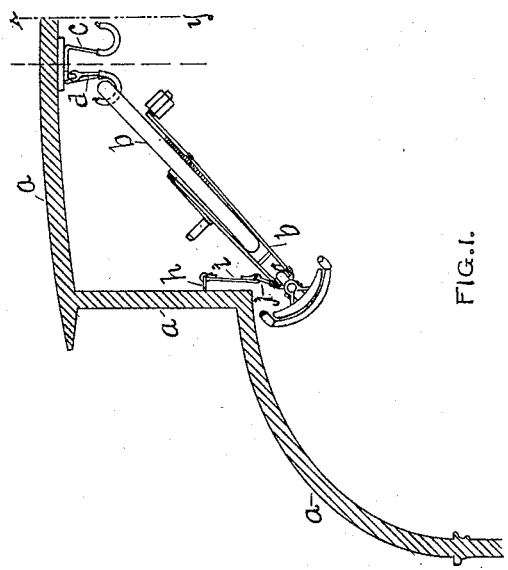
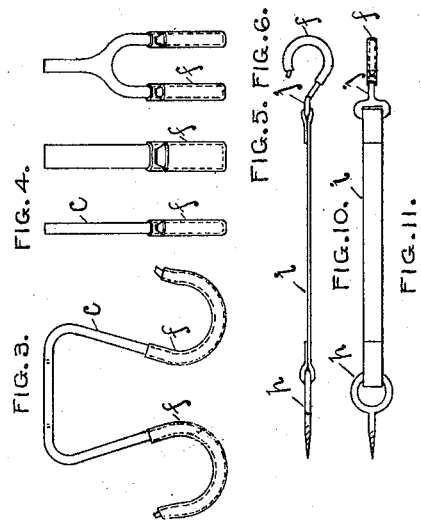
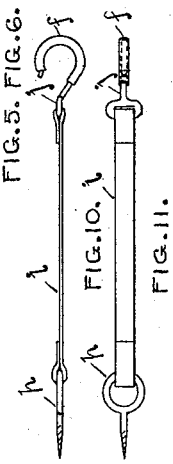
WITNESSES
Harry L. Robertson
Carroll W. Kimball
George L. Kahle,
INVENTOR
per Clem F. Kimball,
HIS ATTORNEY

UNITED STATES PATENT OFFICE.

GEORGE L. KAHLE, OF COUNCIL BLUFFS, IOWA, ASSIGNOR TO FRANK W. WHITCHER, OF BOSTON, MASSACHUSETTS.

BICYCLE-SUPPORT FOR RAILWAY-CARS.

SPECIFICATION forming part of Letters Patent No. 603,509, dated May 3, 1898.

Application filed May 24, 1897. Serial No. 637,979. (No model.)

*To all whom it may concern:*

Be it known that I, GEORGE L. KAHLE, a citizen of the United States, residing at Council Bluffs, in the county of Pottawattamie, State of Iowa, have invented a new and useful Bicycle-Support for Railway-Cars, of which the following is a specification.

My invention is in the nature of a complete holder for bicycles in ordinary railway cars or coaches; and it consists of three hooks of different shapes in conjunction with one another and with proper attachments or of two hooks and one clamp, and in either case so made and placed as to be adjustable to different-sized bicycles and adapted to a multiplication in series in each car or coach; and the objects of my invention are, first, to provide a convenient, secure, and accessible support for bicycles just beneath the roof of railway cars or coaches; second, to provide such a bicycle-support composed of improved hooks and attachments which by simple multiplication of the same provide support for the greatest possible number of bicycles directly beneath the roof of the railway car or coach above and out of the way of persons standing or passing below them and above and remote from baggage or express matter placed in the car; third, to provide adjustable hooks for such a bicycle-support, so that bicycles of any size as built may be supported as aforesaid; fourth, to provide such a means of support as will not mar, scratch, or harm the enamel or varnish or the parts of bicycles placed thereon. I attain these objects by the devices illustrated in the accompanying drawings, in which—

Figure 1 is an end elevation of the several hooks constituting the support attached to the car or coach and shows the bicycle as held in position. Fig. 2 is a side elevation of the support for one bicycle and the hooks constituting it, showing a side elevation of the bicycle in position as held by the hooks and is also a cross-section on the line $x\, y$ of the roof and cove of a portion of a railway car or coach. Figs. 3 and 4 are two respective views of the double hook which engages one of the wheels of the bicycle; and Figs. 5 and 6 are elevations of the same hook, which may be made in two other forms, as shown, to hold the front wheel of the bicycle in the plane of the other wheel and frame and prevent said front wheel and handle-bars from swinging about. Figs. 7, 8, and 9 are three respective views of the adjustable hook for the other wheel. Figs. 10 and 11 are respectively plan and elevation of the third hook, which engages the frame of the bicycle; and Figs. 12 and 13 show a clamp-support for the same purpose.

Similar parts in the different views are referred to and indicated by similar letters throughout.

The bicycle is held in place by three hooks or two hooks and a spring-clamp, which in either case, together and in conjunction with one another when fastened to the car or coach $a\ a\ a$, constitute the support. The symmetrical double hook $c$ is formed of a single piece of metal and is of such shape and dimensions that when screwed or fastened to the middle of the roof of the railway car or coach $a\ a$ in a plane at right angles to the said middle line of the roof each hook furnishes a support for one wheel of two bicycles placed symmetrically with said middle line, as shown in Fig. 1. The said hook $c$ engages said wheel by passing around the rim of the same, the rim alone resting on the hook, so that it is immaterial whether the tire be inflated or not. The symmetrical double hook $c$ may also be made with a single standard attached to a foot for fastening and may be made in such forms of wide metal, as illustrated by Figs. 3 and 5, or it may be pronged with two hooks on either side, as shown in Figs. 3 and 6, thus forming a broad support under the rim of the front wheel of the bicycle, so that it will not turn or swing sidewise on said hook, but will remain in the plane of the other wheel and of the bicycle-frame.

The hooks $c$ are covered with leather, rubber, or other soft material, or rubber tubing is drawn over them, as indicated at $f$, to prevent scratching, marring, or abrasion of the polished parts with which they come in contact.

A second hook $d$, Figs. 7, 8, and 9, is hinged on a bar of round section $e$, which bar is so bracketed that it may be secured or screwed to the roof of the car in a horizontal position, and it is so formed that the hook $d$ will turn on the said bar and at the same time can be moved along said bar when the latter is so fastened to the roof of the car or coach. The said hook $d$ engages the back wheel of the bicycle and holds it in the same manner as the hook $c$ engages the front wheel and can be moved on the horizontal bracketed bar $e$ in a position to support the back wheel of a bicycle of any size as built when the front wheel is held by the hook $c$. The hook $d$ is also covered with leather, rubber, or other soft material, or a rubber tubing is drawn over it to prevent the portion of the wheel coming in contact with it from being scratched or marred.

A third hook $j$, as shown in Figs. 10 and 11, is connected with a screw-eye $h$ by a strap of leather, iron, or other metal, so that when the screw-eye $h$ is screwed into the side or roof of the car or coach $a$ and the frame of the bicycle $b$ is swung back to the roof of the car or coach with the hooks $c$ and $d$ engaged in the wheels, as aforesaid, the hook $j$ engages over the frame of the bicycle $b$ and holds the same in the said position. The hook $j$ is covered, like the others, with leather, rubber, or other soft material, or a rubber tubing is drawn over it, as shown at $f$, to prevent marring or scratching the frame.

The hook $j$ may be longer or shorter than shown and fastened to the side or roof of the car directly, or it may be connected to the side or roof of the car by a metal piece or by a spring; or the hook $j$ may be made similar to the hook $d$ and may be attached to the bracketed bar $e$ in the same manner, which bracketed bar $e$ is screwed or fastened to the side of the car or coach, parallel to the roof thereof, so that the said hook $j$ may be slid along the bracketed bar $e$, thus enabling the hook $j$ to be placed at any point along the top tube of the bicycle-frame $b$. A spring-clamp $g$, engaging with the screw-eye $h$, may be used, in which the frame of the bicycle $b$ is firmly held back under the roof of the car or coach by pressing the upper bar of the bicycle-frame into the jaws $k$ $k'$ of the spring-clamp, which jaws may be slightly sprung open to admit the said bar and are so constructed as to firmly clamp the said frame when the same has been placed therein, as aforesaid. The jaws of the clamp are also covered with leather, rubber, or other soft material, or have rubber tubing drawn over them, as shown at $f$, and in the same manner and for the same purpose as with the hooks $c$, $d$, and $j$.

By placing two of the horizontal bracketed bars $e$ in the roof of the car or coach $a$ side by side and parallel, so that the hooks $d$ $d$ turn outward and one of the double hooks $c$ at the proper distance from said bracketed bars in the roof of the car or coach and by placing the hook $j$, connected as aforesaid, or the clamp $g$, connected as aforesaid, on each side of the car or coach $a$ a support is formed for two bicycles, in which the bicycles are swung back nearest the roof of the car or coach and out of the way. By multiplying this arrangement of said hooks and attachments or clamps into a series of supports a rack may be formed the whole length of the car or coach.

I am aware that hooks have been made for supporting or hanging up bicycles to the roofs of cars or coaches used on railways; but such devices, as I am advised, do not hold the bicycles out of the way and next to the roof of the car or coach, or in the secure, accessible, or convenient method herein described, nor are they adjustable to all sizes of bicycles.

I therefore claim as my invention and desire to secure by Letters Patent of the United States—

1. A bicycle-support for railway cars or coaches in the combination of three hooks fastened to the roof and side of the car or coach, and constructed and arranged to hold the wheels and frame of a bicycle as near as possible in a plane parallel to the roof of the car or coach, and directly beneath the same; all substantially as set forth and described.

2. The combination in a support for bicycles in railway cars and coaches, of a symmetrical double hook, $c$, fastened to the middle of the car-roof; a hook $d$, hinged to the bracketed bar, $e$, which bar $e$ is fastened to the roof of the car, one on each side of the middle line of the said roof; and the hook, $j$, attached by the strap, $i$, and the screw-eye $h$, one to each side of the car; together and in conjunction forming a support for two bicycles; all substantially as set forth.

3. The combination in a bicycle-support for railway cars or coaches, of a series of hooks, in which the hook, $d$, is hinged on the bracketed bar, $e$, so it may at the same time be slid along said bar and turned thereon; all substantially as set forth and described.

4. The combination in a bicycle-support for railway cars or coaches of a series of hooks, of which the hook, $j$, is connected to a screw-eye, $h$, by means of the strap, $i$, in such manner that the hook engages the frame of the bicycle when the screw-eye, $h$, is screwed to the side of the car; all as arranged for operation and use as described.

5. A bicycle-support for railway cars or coaches in the combination of three hooks covered with soft material, fastened to the roof and side of the car or coach, and arranged and adapted to hold the wheels and the frame of a bicycle as near as possible in a plane parallel to the roof of the car or coach, and directly beneath the same; all substantially as set forth and described.

GEORGE L. KAHLE.

Witnesses:
HARRY S. ROBERTSON,
ALFRED P. HANCHETT.